United States Patent [19]

Loubier

[11] 4,444,550

[45] Apr. 24, 1984

[54] PERMANENT MAGNET MOLD APPARATUS FOR INJECTION MOLDING PLASTIC BONDED MAGNETS

[76] Inventor: Robert J. Loubier, 5122 Chippewa Ct., Fort Wayne, Ind. 46804

[21] Appl. No.: 435,473

[22] Filed: Oct. 20, 1982

[51] Int. Cl.³ .............................................. B29F 1/00
[52] U.S. Cl. ........................................ 425/3; 425/542
[58] Field of Search .................................. 425/3, 542

[56] References Cited

U.S. PATENT DOCUMENTS 3,663,131  5/1972  Hegewaldt ............................ 425/3
3,881,853  5/1975  Loubier .............................. 425/3 X Primary Examiner—Thomas P. Pavelko
Attorney, Agent, or Firm—George A. Gust

[57] ABSTRACT

This invention relates to mold apparatus for injection molding plastic bonded magnets. The apparatus comprises body means having a molding cavity and gate. The body means includes a magnetizing device composed of a support of non-magnetic material having one or more permanent magnets contained therein and a non-magnetic wall portion interposed between each magnet and the cavity. The wall portion defines at least a portion of the cavity and the permanent magnet is disposed relative to the cavity such that at least a portion of the magnetic field therefrom enters the cavity through the wall portion. The support is of a strength to withstand the pressures of molten plastic in the cavity without the permanent magnet being present therein. The permanent magnet itself is so constructed and is of a physical strength inadequate to withstand such pressures. The support, therefore, isolates the permanent magnet from the molding pressures which could damage the magnet if directly applied thereto.

12 Claims, 7 Drawing Figures

PERMANENT MAGNET MOLD APPARATUS FOR INJECTION MOLDING PLASTIC BONDED MAGNETS

BACKGROUND OF THE INVENTION

1. Field of the Invention

The present invention relates to apparatus for molding plastic bonded magnets and more particularly to apparatus which employs high energy, permanent magnets for magnetizing a ferro-plastic body while it is being molded.

2. Description of the Prior Art

Plastic bonded, permanent magnets are conventional, and in the prior art have been formed of different constituents and have taken many different forms. Typical materials and magnets are disclosed in U.S. Pat. No. 3,872,334 and the references cited therein. In this patent there is disclosed an injection molding apparatus having a molding cavity provided with an electromagnet for magnetizing a molded body while molten. Generally speaking, such apparatus and the magnetizing process are old in the art insofar as the use of electromagnets are concerned, such electromagnets being utilized for the purpose of producing the necessary magnetizing field of a strength sufficient to accomplish the desired magnetization. In the past, permanent magnets have not been used for the reason that the fields developed thereby were not of adequate strength. While permanent magnet materials, such as those from which rare earth magnets are formed, have been known to possess favorable magnetic properties, rare earth magnets have been found to be quite frangible and easily damaged or destroyed when subjected to compressive forces of a magnitude at which plastic parts are injection molded. Other typical prior art is represented by U.S. Pat. No. 4,185,262 wherein ferro-plastic magnets are magnetized subsequent to formation rather than during any molding or forming process.

SUMMARY OF THE INVENTION

In its most general form, the present invention relates to injection mold apparatus which employs permanent magnets for developing the necessary magnetic fields for magnetizing plastic composite magnets during the molding. Such mold apparatus includes body means having a molding cavity and a gate for injecting molten plastic thereinto. The body means includes a magnetizing device which in turn includes a support of non-magnetic material having a permanent magnet contained therein and a non-magnetic wall portion interposed between the magnet and the cavity. The wall portion defines at least a portion of the cavity and the permanent magnet is disposed relative to the cavity such that at least a portion of the magnetic field thereof enters the cavity through said wall portion. The support is of a strength as will withstand the pressure of molten plastic in the cavity during the injection molding process without the permanent magnet being present therein. The permanent magnet itself is of a material and is so constructed that its physical strength standing alone is inadequate to withstand the molding pressures normally encountered in injection molding.

In a more specific form of this invention, the cavity is of cylindrical shape and the support is a mold member which coaxially surrounds the cavity. The support has as a part thereof the aforesaid wall portion, in tubular form, which defines the peripheral surface of the molding cavity. This support is further provided with a plurality of compartments circumferentially spaced about the axis of the cavity. The support further is provided with an encircling outer wall portion and radially arranged partitions which are circumferentially spaced apart. Each pair of adjacent partitions in combination with the inner and outer wall portions define one of the aforesaid compartments. Each of the compartments is adapted to contain a permanent magnet like the one aforesaid. In a preferred embodiment of this invention, the permanent magnet is of the rare earth type.

It is an object of this invention to provide injecting molding apparatus capable of magnetizing a composite plastic magnet during the molding thereof by means of permanent magnets embodied in the mold apparatus.

It is another object of this invention to utilize in such molding apparatus rare earth magnets which are relatively frangible and which cannot withstand directly the forces developed by the injection of molten plastic in a mold cavity.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a perspective illustration of a typical plastic bonded magnet which may be used as a brush roll employed in electrophotographic developing apparatus or the like;

DESCRIPTION OF THE PREFERRED EMBODIMENT

Figure 1:
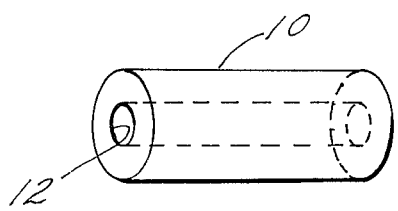
Figure 2:
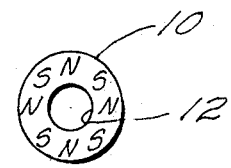
FIG. 2 is an end view thereof.

Referring to FIGS. 1 and 2, a typical plastic bonded magnet 10 which may be fabricated by means of a mold apparatus of the present invention is shown, this particular product being a brush roll which can be employed in electophotographic developing apparatus. Generally speaking, this roll is of cylindrical shape being provided with a coaxial bore 12 for receiving a support shaft or the like. The roll 10 is unique in the respect that it is a permanent magnet having a series of magnetic poles about the circumference thereof, these poles individually extending for the entire length of the roll 10 and being alternated in polarity in equally spaced relation around the roll circumference.

Figure 3:
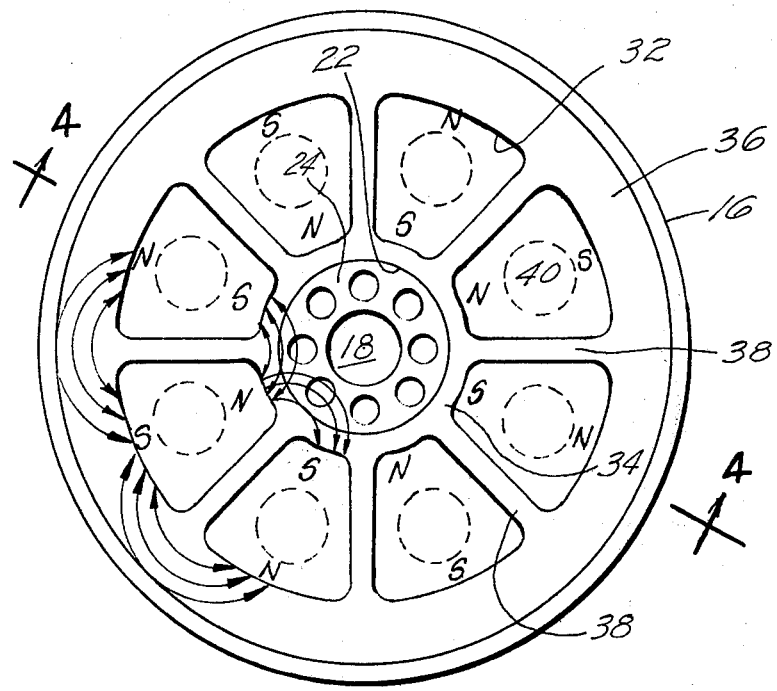
FIG. 3 is a top plan view of a partially disassembled mold apparatus of this invention.
Figure 4:
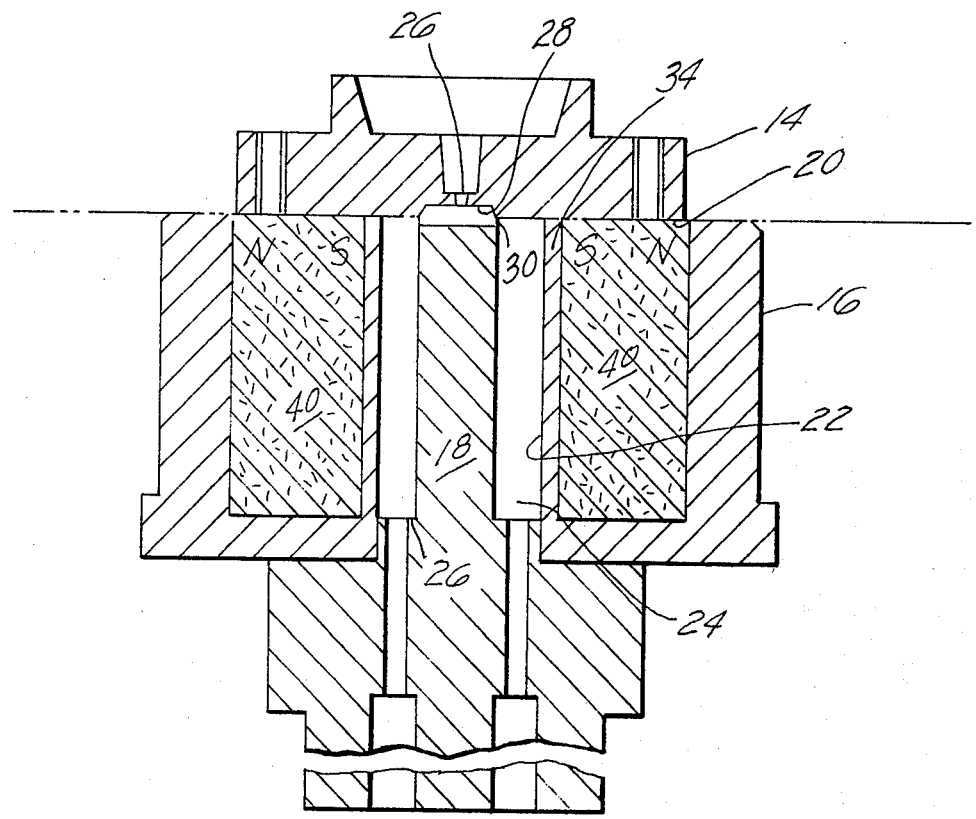
FIG. 4 is a cross section thereof taken substantially along section line 4—4 of FIG. 3.
Figure 5:
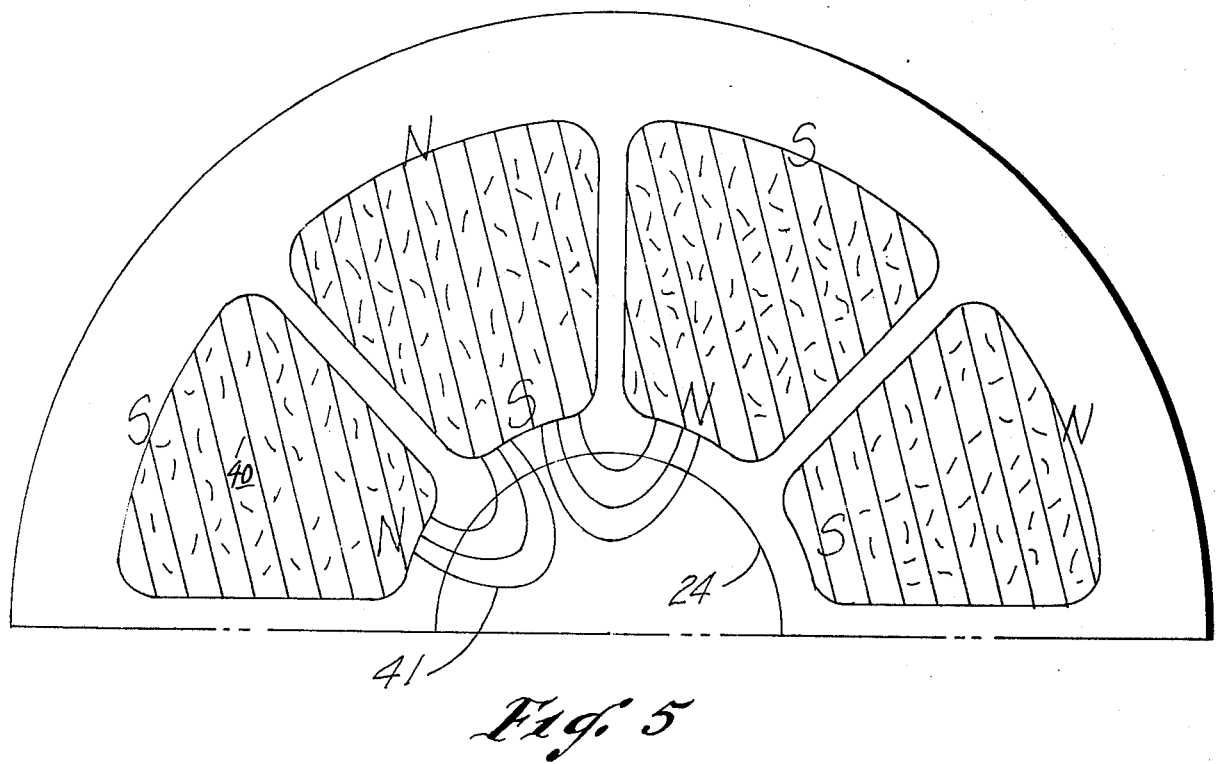
FIG. 5 is a fragmentary enlargement of the apparatus as shown in FIG. 3.

The apparatus for injection molding the roll 10 is shown in FIGS. 3, 4 and 5. The principal parts of the apparatus include an upper mold member or gate insert plate 14, an outer cavity member 16 and a core member 18. The member 14 is essentially a flat plate formed of a non-magnetic material, the undersurface 20 being flat and serving as a parting plane of the apparatus. The cavity member 16 is of cylindrical shape having a coaxial bore 22 which serves as the outer peripheral surface of the cylindrical mold cavity indicated by the numeral 24. The other part of the cavity 24 is defined by the core member or pin 18 which also is of cylindrical shape and is disposed coaxially with respect to the cavity surface 22.

The plate 14 is provided with a centrally disposed passage or gate 26 which communicates with a centrally disposed recess 28 in the undersurface 20, this recess 28 at the edges defining an annular opening or gate 30 with the upper end of the core pin 18. Molten plastic injected through the gate passage 26 flows into the space between the recess 28 and the end of pin 18 and out of the annular opening or gate 30 to fill the cylindrical cavity 24. The bottom of this cavity 24, indicated by the numeral 26, is closed and provided with ejection pins of conventional form for ejecting the molded part from the cavity 24 when the molding operation is completed.

The member 16 is provided with a plurality of elongated bores or compartments 32 which are symmetrically equally circumferentially spaced about the cavity 24 in coaxial relation therewith. These compartments 32 are so formed as to provide an inner, annular wall portion 34, an outer annular wall portion 36, and radial walls or partitions 38, each compartment 32 thereby being defined by these annular wall portions 34 and 36 and the two adjacent side partitions 38. The compartments 32 are elongated and arranged parallel to the axis of the cavity 24. The partitions 38 are essentially flat sections of material extending between the inner and outer wall portions 34 and 36 and otherwise coincide with equally angularly spaced extended radii of the cavity 24.

This member 16, otherwise referred to sometimes as a support, is designed to have sufficient strength to withstand the normal, injection molding pressures of molten plastic injected into the cavity 24. This means, therefore, that the material from which the member 16 is fabricated as well as the dimensions of the wall portions 34, 36 and 38 must be such as to withstand the forces resulting from the molding pressures.

Permanent magnets 40 are installed in the compartments 32, and are of a shape as corresponds thereto. Suitable adhesives may be used for the purpose of securing the magnets in place. Such magnets 40 are made of high energy, permanent magnet material more commonly referred to as rare earth material, typical of such materials being samarium, alloys of cobalt, and others. Rare earth magnets are known to have relatively high energy products, typical being about $20 \times 10^6$ gauss. While this magnitude of energy product makes rare earth magnets particularly suitable for use in apparatus of the type herein contemplated, such magnets are quite frangible and have relatively low compressive strength. For purposes of this invention, such strength is inadequate to survive the injection pressures used in injection molding. This property thus makes rare earth magnets generally unsuitable as mold elements in molding apparatus.

Since the mold member 16 has sufficient strength in and of itself by reason of its particular design, it follows that rare earth magnets 40 secured within the respective compartments 22 cannot be damaged by the pressure of molten material injected into the cavity 24. The necessary strength in the mold member 16 is achieved by using metal as the material thereof; however, not all materials are suitable, especially those that shunt or short out the magnetic fields produced by the magnets 40. Steel or any similar magnetic material therefore cannot be used. As to non-magnetic materials, not all of these are suitable by reason of the inadequate physical properties, brass, aluminum and plastic being examples. A suitable non-magnetic material found to survive reasonably well in mold apparatus is titanium. Other possible materials are stainless steel and chromoloy (which is a nickle type alloy). These materials are particularly suitable, because they have a value of magnetic permeability very close to that of air or one (1). They also have good structural integrity. The preferred material for the members 14 and 16 is titanium.

The magnets 40 are polarized such that the elongated portions thereof immediately adjacent to the inner wall portion 34 is of one polarity and the radially opposite portion thereof, immediately adjacent to the outer portion 36, is of the opposite polarity. The polarities are alternated circumferentially of the member 16 as indicated in FIGS. 3, 4 and 5.

The radial dimension of the wall portion 34 should be made as small as possible consistent with the requirement of physical strength. Since the material of the wall portion 34 appears as an air gap, it is important that the reluctance of this gap be maintained as small as possible, and this is accomplished by keeping the thickness of the wall portion 34 to a minimum. In providing the alternating pole pattern on the finished roll as shown in FIGS. 1 and 2, a field pattern internally of the cavity 24 is formed as more clearly shown in FIG. 5. Flux lines couple between the alternating poles of adjacent magnets, and pass through the cavity 24 as shown.

The material which is used in forming the roll 10 may be a mixture of suitable thermoplastic material, such as polyamide (Nylon), and anisotropic particles of barrium ferrite, perferably of domain size. Such particles in nature exist as hexagonal shapes in platelet form with the preferred direction of magnetization being at right angles to the plane of the platelets. The percentage of such materials in one embodiment of this invention is 20% thermoplastic and 80% magnetic particles, by volume. This material thoroughly mixed in powdered form is fed into a conventional injection molding machine. If desired, such powdered material may be extruded and pelletized prior to such injection molding. The mold apparatus shown and described is mounted in such a machine and the material is injected through the gates 26 and 30 into the cavity 24 while the insert plate 14 is closed on the upper flat surface of the mold member 16. While the material within the cavity 24 is still molten, the field of the permanent magnets 40 providing the flux lines 41 shown in FIG. 5 passes with maximum density through the cavity 24 in the direction shown. This results in orienting the permanent magnet, barrium ferrite particles in the most favorable direction of magnetization. The plastic is permitted to cool and solidify whereupon the insert plate 14 may be removed and the ejection pins used to remove the molded body from the cavity 24. The finished product, by reason of the particles being magnetically oriented, has a pole pattern about the circumference as already explained in connection with FIGS. 1 and 2.

Figure 6:
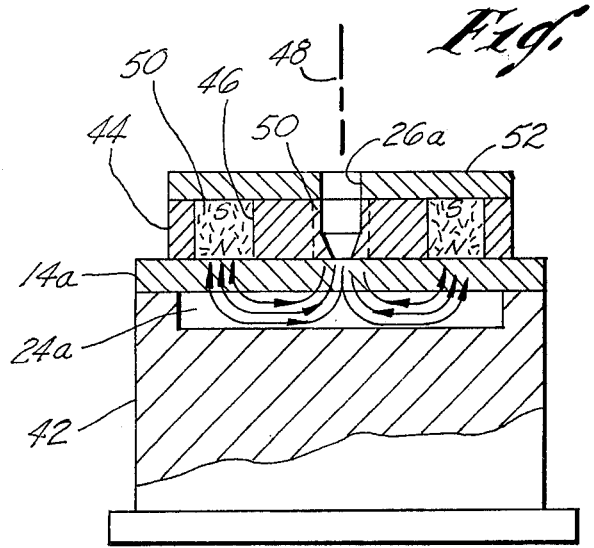
FIG. 6 is a side view, partially sectioned, of a different embodiment of such molding apparatus.
Figure 7:
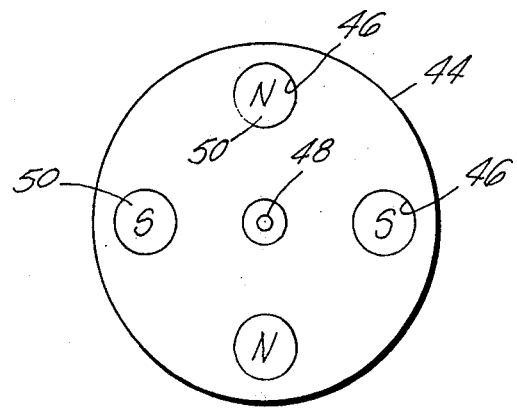
FIG. 7 is a top view of the magnetizing plate assembly thereof.

Different plastic shapes may be molded having any desired pole arrangement, an alternative apparatus for forming another shape being shown in FIGS. 6 and 7. This shape is a disc magnetized to have a pole pattern of alternating poles on the surface, which are circumferentially spaced apart by 90° as shown in FIG. 7. The mold apparatus includes a lower mold member 42 having therein the bottom portion of a disc-shaped cavity 24a. A suitably strong, non-magnetic top plate 14a, also sometimes referred to as a wall portion, engages the flat upper surface of the mold part 42 for closing the cavity 24a. A magnetizing device is superposed on the plate 14a and includes a plate-like support 44 of non-magnetic material having four bores 46 spaced 90° apart about the common axis 48 of the cavity 24a, the cover plate 14a and the supporting plate 44. Rare earth magnets 50 are secured within the bores 46 and are magnetized such that the upper and lower ends as shown in FIG. 6 are of opposite polarity, the poles of circumferentially adjacent magnets being alternated as shown in FIG. 7. In providing the magnets 50 in the bores 46, powdered rare earth material may be packed thereinto and secured in place by means of any suitable, liquid adhesive, or such material may be preformed into a unitary elements each having a size and shape that just fits the corresponding bore 46.

Superposed on the flat upper surface of the supporting plate 44 is another flat disc 52 which overlies and engages the upper ends of the magnets 50. This disc 52 is highly magnetic and may be formed of iron or steel.

A suitable gating passage 26a is provided through all of the plates 14a, 44 and 52 coaxially thereof as shown.

The magnets 50 are so arranged as to provide flux lines 54 through the cavity 24a between the the poles of circumferentially adjacent magnets 50, the non-magnetic plate 14a having a thickness sufficient to withstand the injection molding pressures in the cavity 24a but on the other hand thin enough to assure the flux pattern desired through the cavity 24a. The mold parts 14a, 42 and 44 in the illustrated embodiment are preferably of titanium. In the molding process, the molten plastic composite injected into the cavity 24a via the gating passage 26a encounters the magnetic field 54, whereby the magnetic particles become oriented in the manner as previously explained. When the plastic has solidified, the mold is opened by lifting off the upper mold assembly which includes the plates 14a, 44 and 52. Ejector pins (not shown) may be used for knocking the solidified body out of the cavity 24a. The body will have its upper surface magnetized with the pole pattern corresponding to that shown in FIG. 7.

If it is desired to polarize both surfaces of the molded body, the lower mold part 42, instead of being titanium, may be formed of a suitable ferro-magnetic material, such as steel, whereupon the flux lines will pass directly from the North pole of the individual magnets 50 downwardly through the cavity 24a, through the mold part 42 and upwardly through cavity 24a into the South pole of the circumferentially adjacent magnet. The pole pattern of the magnetized molded body will correspond to this magnetizing field.

From the foregoing it will be apparent that shapes and pole patterns other than those disclosed may be formed by following the teachings of this invention, the permanent magnets formed of frangible material being protected from the pressure of the molten material within the cavity by means of the non-magnetic carrier or support as explained. The resulting apparatus is thus simpler in both design and usage than similar apparatuses, such as disclosed in U.S. Pat. No. 3,872,334, which employ electromagnets. Since no energy is required for developing the magnetic field, this invention provides a corresponding savings in the consumption of energy.

While there have been described above the principles of this invention in connection with specific apparatus, it is to be clearly understood that this description is made only by way of example and not as a limitation to the scope of the invention.

What is claimed is:

1. Mold apparatus for injection molding plastic bonded magnets comprising body means having a molding cavity and gate for said cavity therein, said body means including a magnetizing device which includes a support of non-magnetic material having a permanent magnet contained therein and a non-magnetic wall portion interposed between said magnet and said cavity, said wall portion defining at least a portion of said cavity and said permanent magnet being disposed relative to said cavity such that at least a portion of the magnetic field thereof enters said cavity through said wall portion, said support being of a strength to withstand the pressure of molten plastic in said cavity without said permanent magnet being present therein, and said permanent magnet itself being of a physical strength inadequate to withstand said pressure.

2. The apparatus of claim 1 wherein said permanent magnet is of rare earth material.

3. The apparatus of claim 1 wherein said pressure is about 20,000 psi.

4. The apparatus of claim 1 wherein said support is of a material having a magnetic permeability value of about one (1).

5. The apparatus of claim 2 wherein said support is formed of a material of one of titanium, stainless steel or nickle alloy and has a magnetic permeability value of about one (1).

6. The apparatus of claim 1 wherein said cavity is of cylindrical shape and said support coaxially surrounds said cavity with said wall portion defining the peripheral surface of said cavity, said support having a plurality of compartments circumferentially spaced about the axis of said cavity, said wall portion being of tubular shape and coaxial with respect to said cavity, said support having an encircling outer wall portion and radially arranged partitions which are circumferentially spaced apart, each pair of adjacent partitions in combination with the inner and outer wall portions defining one of said compartments, and each of said compartments containing a permanent magnet like the one aforesaid.

7. The apparatus of claim 6 wherein said magnets and compartments are of a length equal to that of said cavity and are symmetrically coaxially arranged thereabout, said magnets each being polarized in a direction coinciding with an extended radius of said cavity with the polarity of adjacent magnets being reversed whereby flux passes between poles of adjacent magnets through said inner wall portion as well as at least a portion of said cavity, said permanent magnets being of rare earth material.

8. The apparatus of claim 7 wherein said body means includes a non-magnetic plate superposed on one end of said support and closing an end of said cavity, said gate being provided in said plate coaxially of said cavity.

9. The apparatus of claim 7 wherein said compartments in cross-section are trapezoidal in shape.

10. The apparatus of claim 8 including a core pin coaxially disposed within said cavity and of a diameter smaller than the cavity periphery, said pin having an end portion disposed immediately adjacent to said gate which defines therewith an annular gate passage opening into the adjacent end of said cavity whereby molten plastic flowing through said gate also flows through said annular gate passage to fill said cavity from one end and radially outwardly.

11. The apparatus of claim 1 wherein said cavity is defined by at least two mold parts, one of said parts being a plate of non-magnetic material which serves as said wall portion, said support being in plate-like form superposed on said non-magnetic plate, said support having a plurality of compartments therein having portions immediately adjacent to said non-magnetic plate, permanent magnets in said compartments, said permanent magnets being of rare earth material and further being polarized and disposed to cause flux therefrom to pass through said plate and into said cavity.

12. The apparatus of claim 10 wherein said cavity has an extended area end surface and said plate defines said end surface, said compartments being symmetrically spaced in a plane parallel to said end surface, said magnets at one end having poles adjacent to said plate with the polarity of such poles of adjacent magnets being opposite, and a member of magnetically conductive material operatively engaged with and extending between the other ends of said magnets.

* * * * *